US009683910B2

(12) United States Patent
Ekanayake et al.

(10) Patent No.: US 9,683,910 B2
(45) Date of Patent: Jun. 20, 2017

(54) TURBINE LEAK DETECTION SYSTEM

(71) Applicant: General Electric Company, Schenectady, NY (US)

(72) Inventors: Sanji Ekanayake, Mableton, GA (US); Alston Ilford Scipio, Mableton, GA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/955,641

(22) Filed: Dec. 1, 2015

(65) Prior Publication Data

US 2016/0084728 A1 Mar. 24, 2016

Related U.S. Application Data

(63) Continuation of application No. 13/652,648, filed on Oct. 16, 2012, now Pat. No. 9,239,008.

(51) Int. Cl.

| | |
|---|---|
| *G01M 3/20* | (2006.01) |
| *F02C 7/00* | (2006.01) |
| *F02C 7/25* | (2006.01) |
| *F01D 21/00* | (2006.01) |
| *G01M 3/02* | (2006.01) |

(52) U.S. Cl.
CPC .............. *G01M 3/20* (2013.01); *F01D 21/003* (2013.01); *F02C 7/00* (2013.01); *F02C 7/25* (2013.01); *G01M 3/025* (2013.01); *F05D 2260/80* (2013.01)

(58) Field of Classification Search
CPC .......... F02C 7/00; F02C 7/25; F05D 2260/80; G01M 3/20; G01M 3/202; G01M 3/226; G01M 3/227; G01M 3/22
See application file for complete search history.

(56) References Cited

U.S. PATENT DOCUMENTS

| 4,007,755 A | 2/1977 | Lerner et al. |
| 5,974,860 A | 11/1999 | Kuroda et al. |

(Continued)

OTHER PUBLICATIONS

Office Action for U.S. Appl. No. 13/652,648, dated Mar. 31, 2015, 28 pages.

(Continued)

*Primary Examiner* — Paul West
*Assistant Examiner* — Mark A Shabman
(74) *Attorney, Agent, or Firm* — Ernest G. Cusick; Hoffman Warnick LLC (57) ABSTRACT

Various embodiments include a leak detection system for a turbine compartment. In some embodiments, the leak detection system includes: a tracer fluid system fluidly connected with the turbine compartment, the tracer fluid system configured to provide an optically detectable fluid to a fluid supply of the turbine compartment; an optical detection system operably connected to the turbine compartment, the optical detection system configured to detect the presence of the optically detectable fluid in at least one location of the turbine compartment; and a control system operably connected to the tracer fluid system and the optical detection system, the control system configured to obtain data about the presence of the optically detectable fluid in the at least one location, and provide an indicator indicating a potential leak location based upon the data about the presence of the optically detectable fluid in the at least one location.

12 Claims, 4 Drawing Sheets

(56) References Cited

U.S. PATENT DOCUMENTS

| | | |
|---|---|---|
| 6,165,384 A | 12/2000 | Cooper et al. |
| 6,505,526 B2 | 1/2003 | Zabala et al. |
| 6,761,629 B1 | 7/2004 | Parker et al. |
| 7,134,322 B1 | 11/2006 | Baird |
| 2008/0277586 A1 | 11/2008 | Cardinale |
| 2011/0245682 A1 | 10/2011 | Robinson et al. |

OTHER PUBLICATIONS

Final Office Action for U.S. Appl. No. 13/652,648, dated Sep. 4, 2015, 16 pages.
Notice of Allowance and Fee(s) Due for U.S. Appl. No. 13/652,648, dated Nov. 6, 2015, 7 pages.

TURBINE LEAK DETECTION SYSTEM

FIELD OF THE INVENTION

The subject matter disclosed herein relates to detecting fuel leaks. More particularly, aspects of the invention include systems and methods for detecting fuel leaks.

BACKGROUND OF THE INVENTION

Gas turbine (GT) systems, in particular, heavy-duty gas turbine (HDGT) systems, are utilized in various locations, in part because these HDGTs can run on a variety of fuel types. For example, HDGTs can operate using fuels such as heavy oils, naphtha, diesel fuel (e.g., distillate), flare gas, synthesis gas (or, syngas), landfill gas and/or natural gas. Due to the availability of particular forms of fuel (or lack thereof), some HDGTs are designed to operate on multiple fuel types, for example, both natural gas and distillate.

Detecting fuel leaks in HDGT systems allows for safe and efficient operation of those systems. Detecting fuel leaks can be particularly helpful where an HDGT system is adapted to operate using multiple fuel types. Conventional fuel leak detection systems for HDGTs are ineffective in properly identifying leaks.

BRIEF DESCRIPTION OF THE INVENTION

Various embodiments include a leak detection system for a turbine compartment. In some embodiments, the leak detection system includes: a tracer fluid system fluidly connected with a fluid supply to the turbine compartment, the tracer fluid system configured to provide an optically detectable fluid to the fluid supply prior to introduction to the turbine compartment; an optical detection system operably connected to the turbine compartment, the optical detection system configured to detect the presence of the optically detectable fluid in at least one location of the turbine compartment; and a control system operably connected to the tracer fluid system and the optical detection system, the control system configured to obtain data about the presence of the optically detectable fluid in the at least one location, and provide an indicator indicating a potential leak location based upon the data about the presence of the optically detectable fluid in the at least one location.

A first aspect of the invention includes a leak detection system for a turbine compartment, the leak detection system including: a tracer fluid system fluidly connected with the a fluid supply to the turbine compartment, the tracer fluid system configured to provide an optically detectable fluid to the fluid supply prior to introduction to the turbine compartment; an optical detection system operably connected to the turbine compartment, the optical detection system configured to detect the presence of the optically detectable fluid in at least one location of the turbine compartment; and a control system operably connected to the tracer fluid system and the optical detection system, the control system configured to obtain data about the presence of the optically detectable fluid in the at least one location, and provide an indicator indicating a potential leak location based upon the data about the presence of the optically detectable fluid in the at least one location.

A second aspect of the invention includes a method of detecting a leak in a turbine compartment, the method including: introducing an optically detectable fluid to a fluid supply for the turbine compartment, wherein the fluid supply comprises a gas fuel or a liquid fuel for powering a turbine; optically monitoring at least one location of the turbine compartment to determine the presence of the optically detectable fluid at the at least one location; obtaining data regarding the presence of the optically detectable fluid in the at least one location; and providing an indicator indicating a potential leak location based upon the data regarding the presence of the optically detectable fluid at the at least one location.

A third aspect of the invention includes a computer program product stored on at least one computer readable storage medium, which when executed by at least one computing device, performs a method for detecting a leak in a turbine compartment, the method comprising: introducing an optically detectable fluid to a fluid supply of the turbine compartment, wherein the fluid supply comprises a gas fuel or a liquid fuel for powering a turbine; optically monitoring at least one location of the turbine compartment to determine the presence of the optically detectable fluid at the at least one location; obtaining data regarding the presence of the optically detectable fluid in the at least one location; and providing an indicator indicating a potential leak location based upon the data regarding the presence of the optically detectable fluid at the at least one location.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted, the subject matter disclosed herein relates to detecting fuel leaks. More particularly, aspects of the invention include systems and methods for detecting fuel leaks.

Gas turbine (GT) systems, in particular, heavy-duty gas turbine (HDGT) systems, are utilized in various locations, in part because these HDGTs can run on a variety of fuel types. For example, HDGTs can operate using fuels such as heavy oils, naphtha, diesel fuel (e.g., distillate), flare gas, synthesis gas (or, syngas), landfill gas and/or natural gas. Due to the availability of particular forms of fuel (or lack thereof), some HDGTs are designed to operate on multiple fuel types, for example, both natural gas and distillate.

Detecting fuel leaks in HDGT systems allows for safe and efficient operation of those systems. Detecting fuel leaks can be particularly helpful where an HDGT system is adapted to operate using a multiple fuel types. However, conventional fuel leak detection systems for HDGTs are ineffective in properly identifying leaks. That is, these conventional fuel leak detection systems cannot do more than merely identify that a leak exists in the system. These conventional fuel leak detection systems fail to identify the location of the leak in the HDGT system. As such, when a leak is detected using these conventional systems, the HDGT system is traditionally shut down to locate the leak and purge the system of fuel. The process of shutting down and purging the HDGT system can be both costly and time-consuming.

In contrast to conventional approaches, various embodiments of the invention include systems and methods for identifying a specific location of a fuel leak in an HDGT system. Additionally, these methods and systems can identify a location of a water injection leak in an HDGT combustion system.

Figure 1:
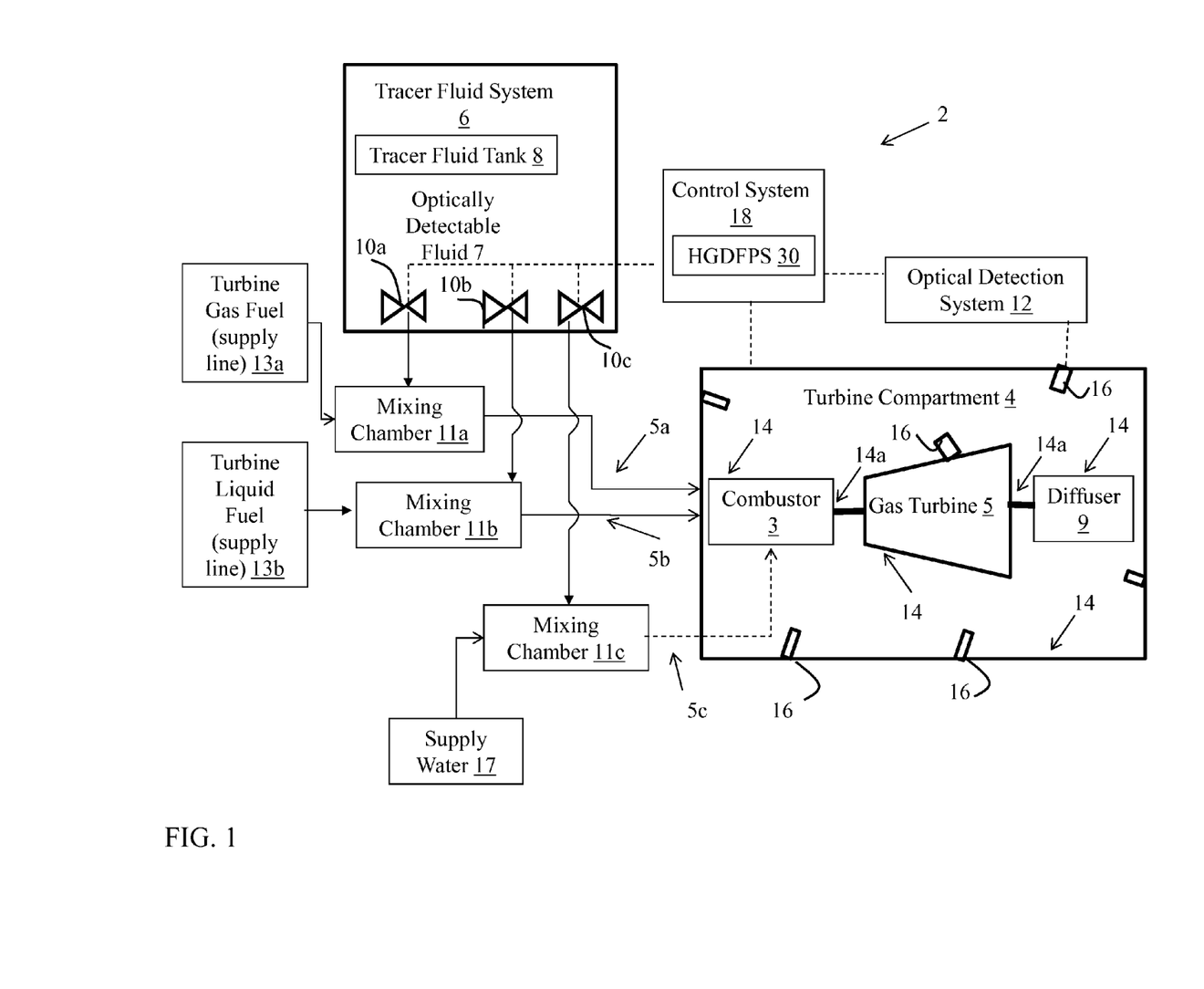
FIG. 1 shows a schematic view of a leak detection system and a turbine compartment according to various embodiments of the invention.

In particular embodiments, as illustrated in the schematic depiction of FIG. 1, a leak detection system 2 for a turbine compartment 4 is disclosed. In various embodiments, the turbine compartment 4 can include a gas turbine compartment, which in some cases, can include a gas turbine 5 having associated components such as a rotor, stator, guide vanes, buckets, seals, etc. As described herein, the turbine compartment 4 and/or the gas turbine 5 can show signs of leakage (e.g., leakage of a working fluid such as gas, leakage of a coolant such as water, or leakage of any other fluid intended to be confined in any space within the turbine compartment 4), and the leak detection system 2 is configured to detect leakage in at least one location of the turbine compartment 4.

The leak detection system 2 can include a tracer fluid system 6 fluidly connected with the turbine compartment 4 via a plurality of distinct fluid supplies 5a, 5b, 5c. That is, the tracer fluid system 6 is connected with the turbine compartment 4 such that a fluid (e.g., a gas, liquid, etc.) can flow between the tracer fluid system 6 and the turbine compartment 4 (when introduced to the turbine compartment 4 through one or more of the fluid supplies 5a, 5b, 5c. The tracer fluid system 6 can be configured to provide an optically detectable fluid 7 (e.g., a colored gas or liquid) to one or more of the fluid supplies: turbine gas fuel fluid supply 5a, turbine liquid fuel supply 5b, and turbine water supply 5c; and then provide that fluid to the turbine compartment 4 (in a mixture with at least one of gas fuel 13a, liquid fuel 13b and/or supply water 17). In some cases, the tracer fluid system 6 can include a tracer fluid tank 8, which can include a tracer fluid such as a colored (e.g., red, blue, green, etc.) fluid. The tracer fluid system 6 can include at least one valve 10 (three shown), each for controlling the providing of the optically detectable fluid 7 to the turbine compartment 4. In various embodiments, the tracer fluid system 6 includes a first valve 10a for providing the optically detectable fluid 7 to a first mixing chamber 11a for mixing with the turbine gas fuel 13a before introduction to the turbine compartment 4. In various embodiments, the tracer fluid system 6 includes a second valve 10b for providing the optically detectable fluid 7 to a second mixing chamber 11b for mixing with the turbine liquid fuel 13b before introduction to the turbine compartment 4. In various embodiment, the tracer fluid system 6 includes a third valve 10c for providing the optically detectable fluid 7 to a third mixing chamber 11c for mixing with the supply water 17 prior to introduction to the turbine compartment 4. Each of the mixing chambers 11a, 11b, 11c, respectively can allow for mixing of the optically detectable fluid 7 with one of the fluid supply types (gas fuel 13a, liquid fuel 13b, or supply water 17, respectively).

In any case, the tracer fluid system 6 (and particularly, the tracer fluid tank 8) is fluidly connected with each fluid supply 5a (gas fuel/tracer fluid mixture), 5b (liquid fuel/tracer fluid mixture) and 5c (supply water/tracer fluid mixture), which provides a fluid to the turbine compartment 4. In some cases, the turbine compartment 4 can utilize all three fluid supplies 5a, 5b, 5c, and in other cases, the turbine compartment 4 can utilize only some of the distinct fluid supplies 5a, 5b, 5c. For example, in some cases, the combustor 3 could utilize a mixture of gas fuel 13a (via fluid supply 5a) and liquid fuel 13b (via fluid supply 5b). In some of these cases, the combustor 3 may further utilize supply water 17 (via fluid supply 5c). In other cases, the combustor 3 may only utilize one of the fuel types (13a or 13b), and in some of those cases, the supply water 17.

It is further understood that one or more of the fluid supplies 5a, 5b, 5c can be configured to include or exclude the optically detectable fluid 7. That is, in some cases, the control system 18 can be configured to keep one or more of the control valves 10a, 10b or 10c closed so as to allow the gas fuel 13a, liquid fuel 13b and/or supply water 17 to flow through the respective mixing chamber 11a, 11b and/or 11c without mixing with optically detectable fluid 7, and eventually flow to the turbine compartment 4 (e.g., the combustor 3).

The leak detection system 2 can further include an optical detection system 12 operably connected to the turbine compartment 4. That is, the optical detection system 12 can be electrically, mechanically, electro-mechanically and/or wirelessly connected with the turbine compartment 4. In some cases, the optical detection system 12 can be mounted or otherwise affixed to the turbine compartment 4. In other cases, the optical detection system 12 can be located remotely from the turbine compartment 4, and can communicate via wireless transmission such as conventional radio-frequency (RF) transmission. The optical detection system 12 can be configured to detect the presence of the optically detectable fluid 7 (provided by the tracer fluid system 6) in at least one location 14 (multiple locations shown) of the turbine compartment 4. In various embodiments of the invention, the optical detection system 12 includes at least one camera 16 for optically detecting the presence of the optically detectable fluid 7 in the at least one location 14 of the turbine compartment 4. In some cases, the camera 16 can be positioned to enable detection of the presence of the optically detectable fluid 7 for example, the camera 16 can be positioned to direct its focus toward a particular area of the turbine compartment 4. In these cases, the camera 16 may be positioned to direct its focus at a joint, junction, seal (generally referred to as joints 14a) or between adjacent components of the turbine compartment 4, or other area of the turbine compartment 4 which may experience a leak (revealing the optically detectable fluid 7).

The leak detection system 2 can further include a control system 18 operably connected to the tracer fluid system 6 and the optical detection system 12, the control system 18 configured to obtain data about the presence of the optically detectable fluid in the at least one location 14, and provide an indicator (e.g., an alert or a passive notification stored or presented in a data log) indicating a potential leak location (e.g., location 14 or a location proximate location 14) based upon the data about the presence of the optically detectable fluid 7 in the at least one location 14.

In some cases, the control system 18 can include a hazardous gas detection/fire prevention system (HGDFPS) 30, which can be operably connected to the turbine compartment 4 and the optical detection system 12 (by way of the control system 18). In various embodiments, when an alarm is triggered in the HGDFPS 30, the control system 18 can actuate one or more of the control valves 10a, 10b and/or 10c to introduce the optically detectable fluid 7 to one or more of the mixing chambers 11a, 11b and/or 11c to enter the fluid supply 5a, 5b and/or 5c to the turbine compartment 4. The optical detection system 12 can then detect the presence of the optically detectable fluid 7 (in the case that a leak exists) and provide an indicator (e.g., an alert 122, FIG. 2, or a passive notification such as an entry in a data log) that indicates a potential leak location 14.

In some cases, the control system 18 and the optical detection system 12 can operate in an elapsed time interval detection mode (e.g., every x minutes, for example, every 30 minutes). In this case, the control system 18 is configured to introduce the optically detectable fluid 7 (e.g., a colored gas or liquid) to the fluid supply 5a, 5b and/or 5c to obtain data about the presence of the optically detectable fluid 7 in the at least one location 14, and provide an indicator (e.g., an alert 122 or a passive notification stored or presented in a data log), indicating a potential leak location (e.g., location 14 or a location proximate location 14) based upon the data about the presence of the optically detectable fluid 7 in the at least one location 14. In these cases, the control system 18 operates periodically according to a predetermined schedule to test the turbine compartment 4 for a potential leak location 14.

It is understood that the control system 18 and optical detection system 12 can further operate in a mixed operational mode, whereby the control system 18/optical detection system 12 operate to test for a potential leak location 14 on a periodic basis (e.g., every 10, 15 or 30 minutes), but also respond to a trigger from the HGDFPS 30 to test for a leak location 14 in response to a trigger from the HGDFPS 30.

In some cases, as described herein, the control system 18 is configured to actuate the at least one valve 10a, 10b, 10c to control providing of the optically detectable fluid 7 to the turbine compartment 4 (via at least one of the fluid supplies 5a, 5b, 5c). In various embodiments of the invention, the at least one valve 10a, 10b, 10c can include a solenoid valve, which can be electrically actuated by the control system 18.

Figure 2:
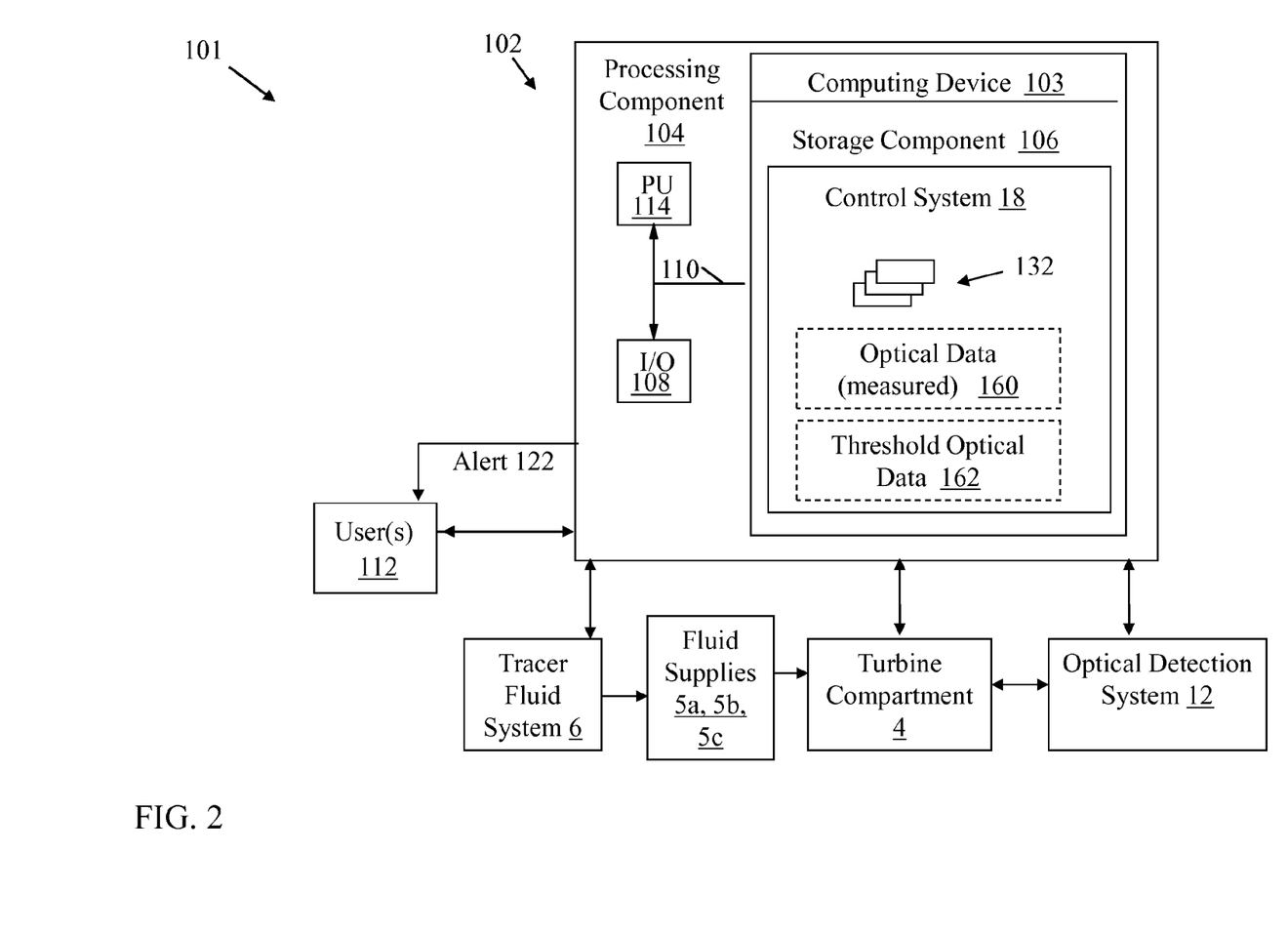
FIG. 2 shows an environment including the at least one computing device according to various embodiments of the invention.

FIG. 2 depicts an illustrative environment 101 for performing the control system processes described herein with respect to various embodiments. To this extent, the environment 101 includes a computer system 102 that can perform one or more processes described herein in order to control operation of a tracer fluid system (e.g., tracer fluid system 6) and an optical detection system (e.g., optical detection system 12). In particular, the computer system 102 is shown as including the control system 18, which makes computer system 102 operable to control a tracer fluid system and/or an optical detection system by performing any/all of the processes described herein and implementing any/all of the embodiments described herein.

The computer system 102 is shown including a computing device 103, which can include a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the control system 18, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a user (e.g., a human and/or computerized user) 112 to interact with the computer system 102 and/or one or more communications devices to enable the system user 112 to communicate with the computer system 102 using any type of communications link. To this extent, the control system 18 can manage a set of interfaces (e.g., graphical user interface(s), application program interface, etc.) that enable human and/or system users 112 to interact with the control system 18. Further, the control system 18 can manage (e.g., store, retrieve, create, manipulate, organize, present, etc.) data, such as optical data 160 and/or threshold optical data 162 using any solution. It is understood that the optical data 160 can include data obtained by the optical detection system 12 about the presence of the optically detectable fluid 7 within (or proximate to) the turbine compartment 4, e.g., at a particular location 14. Threshold optical data 162 can include data representing a threshold presence of optically detectable fluid necessary in order to establish that a leak exists at the location 14. That is, the threshold optical data 162 can be based upon predetermined conditions which account for the severity of a leak. For example, the threshold optical data 162 may establish a threshold indicating that a certain portion of an image indicate the presence of the optically detectable fluid 7 in order to establish that a leak exists at the location 14. The control system 18 can additionally communicate with the tracer fluid system 6, optical detection system 12 and/or user 112, e.g., via wireless and/or hardwired means.

In any event, the computer system 102 can comprise one or more general purpose computing articles of manufacture (e.g., computing devices) capable of executing program code, such as the control system 18, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the control system 18 can be embodied as any combination of system software and/or application software. It is further understood that the control system 18 can be implemented in a cloud-based computing environment, where one or more processes are performed at distinct computing devices (e.g., a plurality of computing devices 103), where one or more of those distinct computing devices may contain only some of the components shown and described with respect to the computing device 103 of FIG. 3.

Further, the control system 18 can be implemented using a set of modules 132. In this case, a module 132 can enable the computer system 102 to perform a set of tasks used by the control system 18, and can be separately developed and/or implemented apart from other portions of the control system 18. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of control system 18 fixed thereon (e.g., one or more modules 132). However, it is understood that the computer system 102 and control system 18 are only representative of various possible equivalent computer systems that may perform a process described herein. To this extent, in other embodiments, the functionality provided by the computer system 102 and control system 18 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as optical data 160 and/or threshold optical data 162 using any solution. The computer system 102 can generate optical data 160 and/or threshold optical data 162, from one or more data stores, receive optical data 160 and/or threshold optical data 162, from another system such as the optical detection system 12 and/or the user 112, send optical data 160 and/or threshold optical data 162 to another system, etc.

While shown and described herein as a method and system for controlling a tracer fluid system 6 and an optical detection system 12, e.g., to determine whether a leak exists in the turbine compartment 4, it is understood that aspects of the invention further provide various alternative embodiments. For example, in one embodiment, the invention provides a computer program fixed in at least one computer-readable medium, which when executed, enables a computer system to control a tracer fluid system 6 and an optical detection system 12. To this extent, the computer-readable medium includes program code, such as the control system 18 (FIG. 2), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the control system 18 (FIG. 3), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for controlling/monitoring a turbine compartment 4 (e.g., monitoring for a leak in the turbine compartment 4. In this case, a computer system, such as the computer system 102 (FIG. 3), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

In any case, the technical effect of the invention, including, e.g., the control system 18, is to control operation of a tracer fluid system (e.g., tracer fluid system 6) and an optical detection system (e.g., optical detection system 12) to detect a potential leak in a turbine compartment (e.g., turbine compartment 4) in one of the various manners described and illustrated herein.

Figure 3:
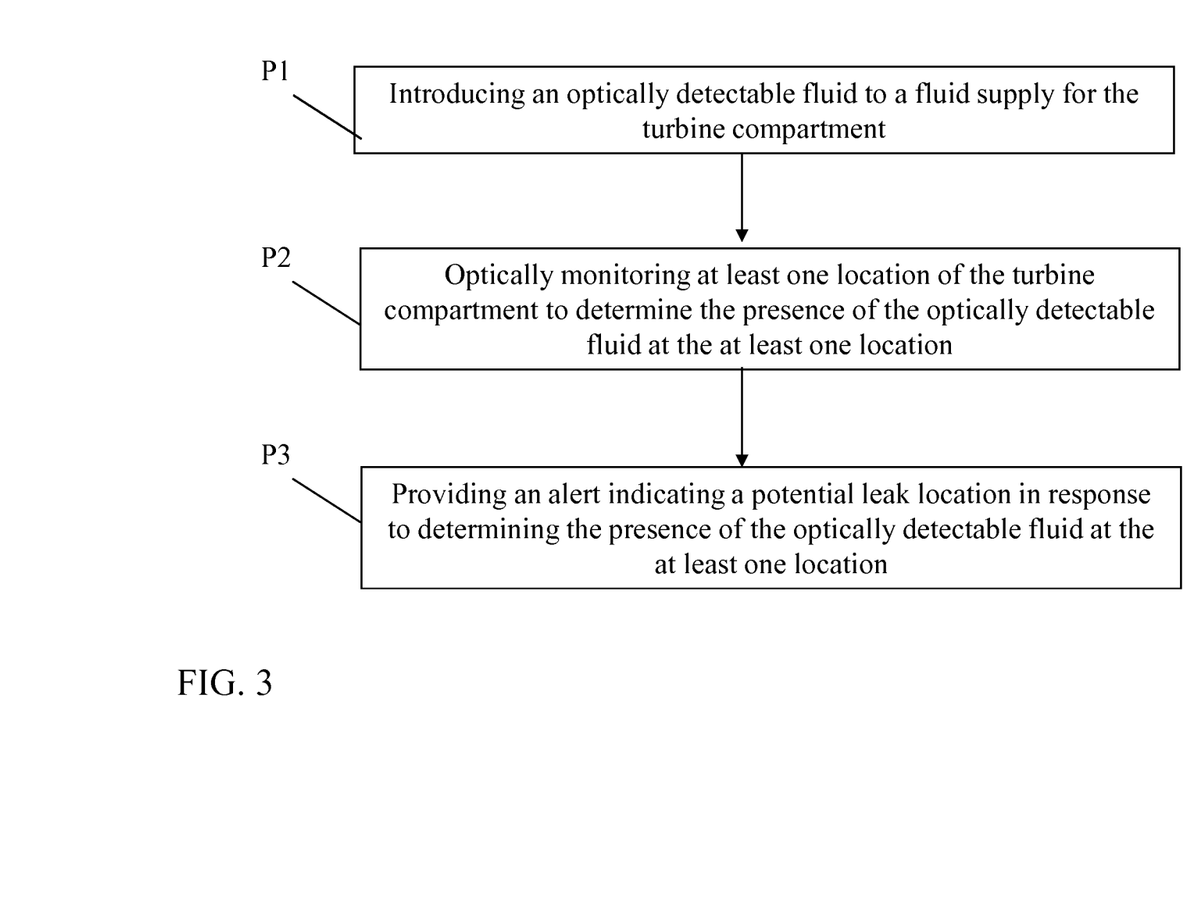
FIG. 3 shows a method flow diagram illustrating processes according to various embodiments of the invention.

FIG. 3 shows a method flow diagram illustrating processes according to various embodiments of the invention. For illustrative purposes, portions of the method refer to elements shown and described in FIGS. 1 and 2. As shown, various embodiments of a method of detecting a leak in a turbine compartment can include processes including:

Process P1: introducing an optically detectable fluid 7 to a fluid supply 5*a*, 5*b* and/or 5*c* for the turbine compartment 4 (e.g., after mixing the optically detectable fluid 7 with gas fuel 13*a*, liquid fuel 13*b* and/or supply water 17);

Process P2: optically monitoring at least one location 14 of the turbine compartment 4 to determine the presence of the optically detectable fluid 7 at the at least one location 14; and Process P3: providing an indicator (e.g., an alert 122, FIG. 2) indicating a potential leak location (e.g., location 14) in response to determining the presence of the optically detectable fluid 7 at the at least one location 14. In some cases, the indicator, in the form of an alert 122, is provided to the user(s) 112 (FIG. 2) as an audible, visible, tactile or other indicator which indicates the potential for a leak at the at least one location 14. In some cases, the alert 122 can include a preliminary indicator which indicates that the location 14 is showing only preliminary signs of leakage (e.g., a presence of optically detectable fluid 7 which has yet to exceed the level of threshold optical data 162). In various embodiments of the invention, the alert 122 can include data about the location 14 of the potential leak such that one or more user(s) 112 (FIG. 2) may respond to the leak at the particular location 14. As described herein, providing a specific location 14 of the potential leak can allow one or more user(s) 112 to address the potential leak without necessarily having to shut down components (e.g., the gas turbine 5, combustor 3 and/or diffuser 9) within the turbine compartment 4.

Figure 4:
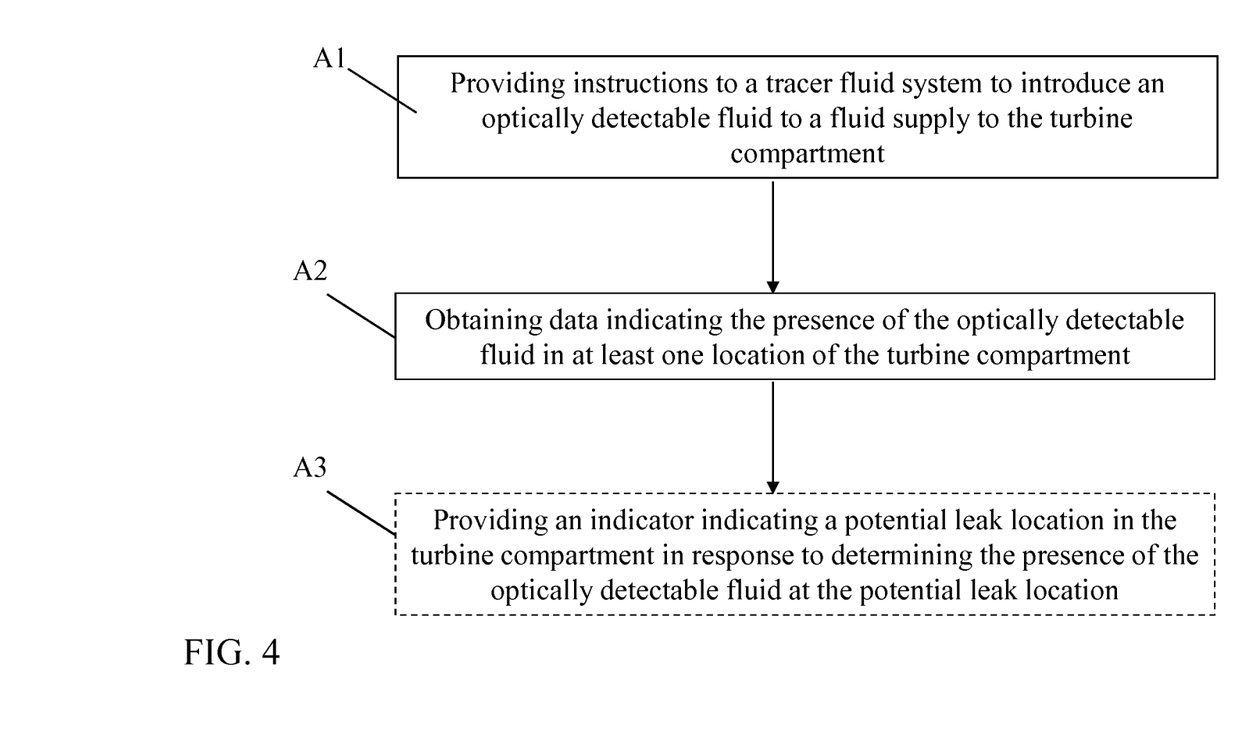
FIG. 4 shows a method flow diagram illustrating process performed by at least one computing device according to various embodiments of the invention.

A third aspect of the invention includes a computer program product stored on at least one computer readable storage medium, which when executed by at least one computing device (e.g., computing device 103, FIG. 2), causes the at least one computing device (e.g., computing device 103, FIG. 2) to detect a leak in a turbine compartment (e.g., turbine compartment 4). Turning to FIG. 4, a process flow diagram is shown illustrating a series of actions performed by the at least computing device (e.g., computing device 103, FIG. 2) to detect the leak in the turbine compartment 4. As shown, this process can include the following actions:

Action A1: providing instructions (e.g., to a tracer fluid system 6) to introduce an optically detectable fluid 7 to a fluid supply 5a, 5b, 5c to the turbine compartment 4 (e.g., via a mixing chamber 11a, 11b, 11c, as described herein). In various embodiments of the invention, the instructions can include instructions to actuate at least one valve 10a, 10b, 10c in the tracer fluid system 6 to permit flow of the optically detectable fluid 7 to the turbine compartment 4 (e.g., after mixing with gas fuel 13a, liquid fuel 13b and/or supply water 17 in mixing chamber 11a, 11b and/or 11c). In some cases, the instructions can include instructions to introduce the optically detectable fluid 7 (after mixing in the mixing chamber 11a, 11b, 11c) to the turbine, e.g., the gas turbine 5 within the compartment 4. In some cases, the at least one valve 10 includes a solenoid valve, and the actuating include electrically actuating the solenoid valve;

Action A2: obtaining data (e.g., optical data 160) indicating the presence of the optically detectable fluid 7 in at least one location 14 of the turbine compartment 4. It is understood that the optical data 160 can include data obtained by the optical detection system 12 about the presence of the optically detectable fluid 7 within (or proximate to) the turbine compartment 4, e.g., at a particular location 14; and Action A3 (optional process indicated in phantom): providing an indicator (e.g., alert 122) indicating a potential leak location 14 in the turbine compartment 4 in response to determining the presence of the optically detectable fluid 7 at the at least one location 14. As described herein, determining of the presence of the optically detectable fluid 7 at the at least one location can include comparing the optical data 160 with the threshold optical data 162. This threshold optical data 162 can include data representing a threshold presence of optically detectable fluid necessary in order to establish that a leak exists at the location 14. That is, the threshold optical data 162 can be based upon predetermined conditions which account for the severity of a leak. For example, the threshold optical data 162 may establish a threshold indicating that a certain portion of an image indicate the presence of the optically detectable fluid 7 in order to establish that a leak exists at the location 14.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of detecting a leak in a turbine compartment, the method comprising:
    introducing an optically detectable fluid to a fluid supply prior to introduction to the turbine compartment, wherein the fluid supply comprises a gas fuel or a liquid fuel for powering a turbine;
    optically monitoring at least one location of the turbine compartment to determine the presence of the optically detectable fluid at the at least one location;
    obtaining data regarding the presence of the optically detectable fluid in the at least one location; and
    providing an indicator indicating a potential leak location based upon the data regarding the presence of the optically detectable fluid at the at least one location.

2. The method of claim 1, wherein the introducing includes actuating at least one valve in a tracer fluid system to permit flow of the optically detectable fluid to the fluid supply for the turbine compartment.

3. The method of claim 2, wherein the at least one valve includes a solenoid valve, and wherein the actuating of the at least one valve includes using a control system to electrically actuate the solenoid valve.

4. The method of claim 1, wherein the introducing of the optically detectable fluid includes introducing the optically detectable fluid to a turbine contained within the turbine compartment.

5. The method of claim 1, wherein the optically monitoring of the at least one location is performed using an optical detection system having at least one camera.

6. The method of claim 1, wherein the optical detection system is positioned to optically detect the presence of the optically detectable fluid in the at least one location of the turbine compartment, wherein the at least one location of the turbine compartment includes a joint between adjacent components in the turbine compartment.

7. A computer program product stored on at least one non-transitory computer readable storage medium, which when executed by at least one computing device, performs a method for detecting a leak in a turbine compartment, the method comprising:
    introducing an optically detectable fluid to a fluid supply prior to introduction to the turbine compartment, wherein the fluid supply comprises a gas fuel or a liquid fuel for powering a turbine;
    optically monitoring at least one location of the turbine compartment to determine the presence of the optically detectable fluid at the at least one location;

obtaining data regarding the presence of the optically detectable fluid in the at least one location; and providing an indicator indicating a potential leak location based upon the data regarding the presence of the optically detectable fluid at the at least one location.

8. The program product of claim 7, wherein introducing the optically detectable fluid further comprises actuating at least one valve in a tracer fluid system to permit flow of the optically detectable fluid to the fluid supply of the turbine compartment.

9. The program product of claim 8, wherein the at least one valve includes a solenoid valve, and wherein the actuating of the at least one valve includes electrically actuating the solenoid valve.

10. The program product of claim 7, wherein the optically monitoring further comprises obtaining optical data from an optical detection system having at least one camera.

11. The program product of claim 7, wherein the at least one location of the turbine compartment includes a joint between adjacent components in the turbine compartment.

12. The program product of claim 7, wherein the method further comprises:

comparing the optical data with threshold optical data; and determining the presence of the optically detectable fluid in response to determining the optical data deviates from the threshold optical data.

* * * * *